United States Patent [19]

Hendricks et al.

[11] 4,311,420
[45] Jan. 19, 1982

[54] SNUBBING BLOCK CARGO STABILIZATION SYSTEM FOR REFRIGERATED CARRIERS

[75] Inventors: Thomas E. Hendricks, Dallas, Tex.; George J. Groenert, Evansville, Ind.

[73] Assignee: Wilson Foods Corporation, Oklahoma City, Okla.

[21] Appl. No.: 94,837

[22] Filed: Nov. 16, 1979

[51] Int. Cl.³ .................. B60P 1/64; B60P 7/10; B61D 45/00; B63B 25/24
[52] U.S. Cl. .................. 410/121; 410/46; 410/81; 410/116; 410/153
[58] Field of Search .................. 41D/47, 96, 97, 48, 41D/99, 100, 110, 111, 112, 113, 114, 115, 116, 101, 102, 103, 104, 105, 106, 107, 108, 109, 121, 46, 81, 116, 121, 153

[56] References Cited

U.S. PATENT DOCUMENTS

| | | |
|---|---|---|
| 2,052,914 | 9/1936 | Williams .................. 410/105 X |
| 2,688,289 | 9/1954 | Sterling .................. 410/104 |
| 2,735,377 | 2/1956 | Elsner .................. 410/105 |
| 3,344,749 | 10/1967 | Bass et al. .................. 410/105 |
| 3,421,726 | 1/1969 | Getter .................. 410/110 |
| 3,478,995 | 11/1969 | Lautzenhiser et al. .................. 410/104 |
| 3,595,125 | 7/1971 | Jacobs .................. 410/106 |
| 3,602,474 | 8/1971 | Deering et al. .................. 410/84 |
| 4,008,669 | 2/1977 | Sumrell .................. 410/47 |
| 4,027,892 | 6/1977 | Parks .................. 410/11 X |
| 4,125,077 | 11/1978 | Baaso .................. 410/82 |

Primary Examiner—Robert R. Song
Assistant Examiner—Howard Beltlran
Attorney, Agent, or Firm—William R. Laney

[57] ABSTRACT

A cargo stabilizing system for preventing shifting of cargo during transport in a carrier vehicle, the system including a channeled cargo-supporting floor, and a snubbing device releasably engaging the floor channels and projecting upwardly to block movement of the cargo. The snubbing device includes a snubbing block and a manually actuatable latching subassembly by which the snubbing block is selectively locked to, or released from, the floor channels. In a preferred form, the snubbing device includes cooperating wedge elements, a handle and an actuator bolt connected between one wedge element and the handle to move the wedge elements relative to each other in a channel locking and releasing movement.

6 Claims, 5 Drawing Figures

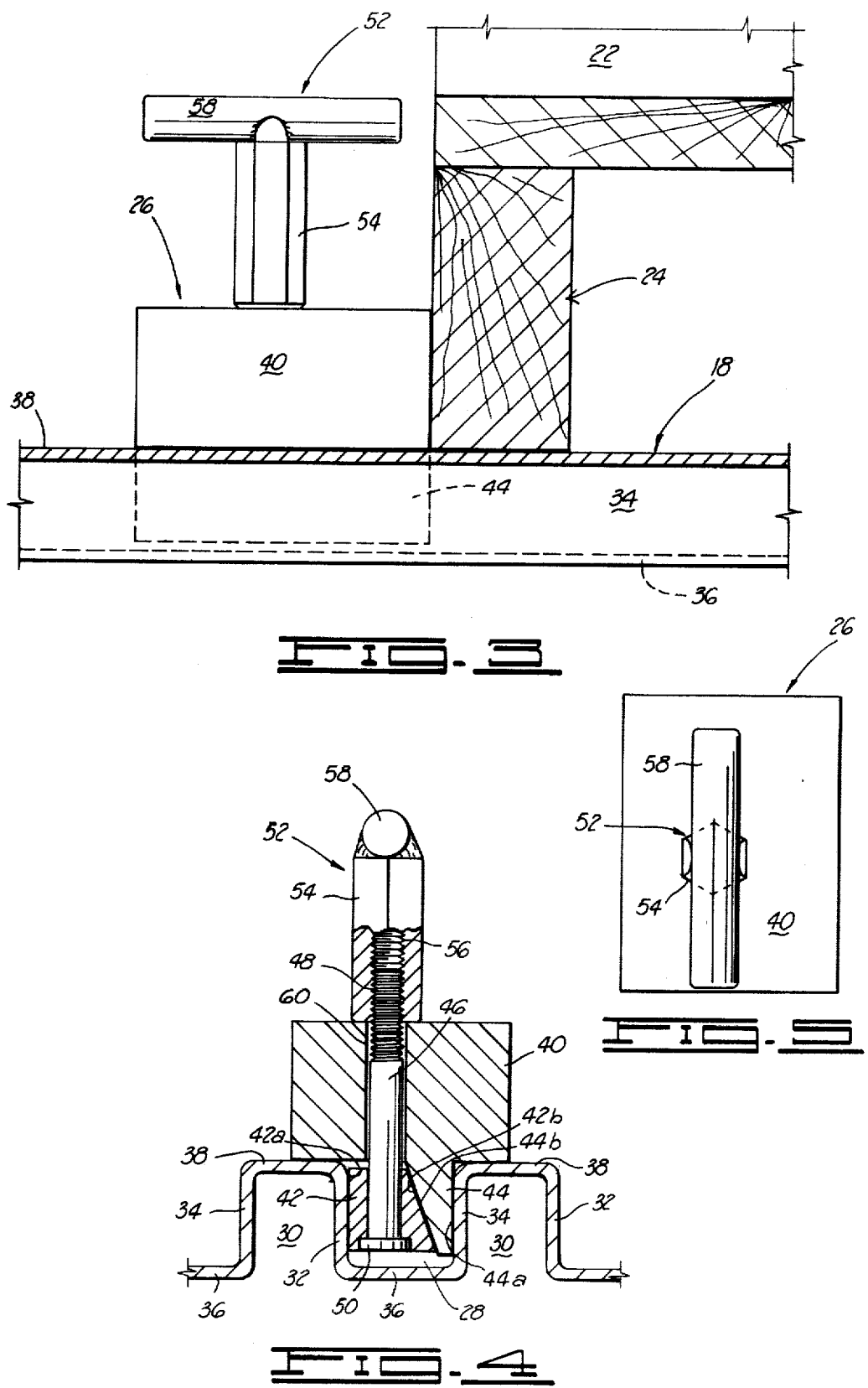

SNUBBING BLOCK CARGO STABILIZATION SYSTEM FOR REFRIGERATED CARRIERS

BACKGROUND OF THE INVENTION

1. Field of the Invention

This invention relates to cargo securing systems for immobilizing heavy bulk cargo during transport thereof. More specifically, the invention relates to structures useful in refrigeration trucks and trailers for stabilizing cargo against sliding movement upon the types of channeled or corrugated floors frequently provided in that type of vehicle.

2. Brief Description of the Prior Art

Perishable foodstuffs are usually transported in refrigerated vehicles. The character of this type of cargo has dictated several criteria in the design of the transports by which it is conveyed. Thus, to assure adequate ventilation to prevent localized spoilage and to improve the overall sanitary environment during transport, the floors of trucks and trailers used for such carriage are usually slotted or channeled to allow cool air to circulate freely beneath the cartons or boxes in which the comestibles are contained. It is also desirable that the interior cargo space of trucks and trailers afford minimum opportunity for dirt, grease or debris to accumulate, and constitute a breeding environment for bacteria. Thus, stakewells or pockets or indentations, which might trap, or act as a repository for, these deleterious materials, are reduced to a minimum or eliminated from the interior walls and ceilings of the vehicles as much as possible.

In the transport of cargo requiring refrigeration, one form of containerization which is finding increased usage is socalled combo loading. In this type of packaging, loose products are loaded into very large cartons and these are then supported upon pallets which rest upon the floor of the refrigeration chamber of the transport vehicle. These cartons are heavy and bulky, and when subjected to the random forces engendered by over-the-road transport they tend to shift from one location to another within the truck or trailer.

At times a portion of the total capacity of the transport trailer is not filled with cargo, and there is more space for the cargo to shift about, and to gain momentum in its movement along the floor or deck of the truck or trailer bed. As a consequence, the cartons in which the cargo is packaged are frequently bent or heavily damaged, and the cargo itself is sometimes ruined or rendered less marketable.

Although various systems and devices have been proposed for stabilizing or immobilizing cargo carried in trucks, some of these structures are not entirely satisfactory where refrigerated cargo is being transported over substantial distances. The described problem of eliminating recesses or pockets in order to prevent bacterial growth by obviating sites for accumulation of dirt, grease or the like makes it undesirable to use bars which extend from one side of the truck body to the other, and are anchored at opposite ends in sockets or recesses formed in the truck walls. The same desideratum also places some limitation on straps or flexible members extended around the cartons and/or pallets in order to arrest movement of the cargo, since ultimately such flexible securing elements must be anchored in some way to either the walls, floor or ceiling of the truck, and this again sometimes entails the provision of undesirable sockets, wells or pad eyes to enable such anchoring to be accomplished.

In Deering et al. U.S. Pat. No. 3,602,474, a pallet restraint apparatus is illustrated and described. This apparatus includes a snubbing device or block which is mounted to one side of a cargo pallet by means of a threaded bolt which can be used to draw the snubbing block vertically in relation to the pallet. A portion of the snubbing block projects laterally from the pallet and, as the snubbing block is moved vertically by rotation of the threaded bolt, this portion of the block is brought into frictional engagement with restraint rails mounted in a vehicle to provide guidance and restraint to the pallet and the cargo carried thereon.

In one form of the Deering restraint apparatus, a resilient slipper is placed over a portion of the snubbing block, and by cooperation of an inclined surface formed at one side of the slipper with an inclined surface formed on the snubbing block, the slipper is caused to expand laterally as it undergoes vertical compression during the vertical movement of the snubbing block. This lateral displacement of the resilient slipper, combined with the compressive force exerted thereon to also cause lateral resilient deformation, forces the slipper into firm engagement with a vertical portion of the restraining rail, and thus further enhances the locking function of the restraint apparatus.

The Deering pallet restraint apparatus requires that the snubbing system be built into, and made an integral part of, the pallet, and further requires specific and fixed positioning of certain movable elements of the restraint apparatus in order to engage restraint rails of a particular shape which must be located in the cargo-carrying vehicle at a particular location in relation to the pallets in order for the systems to function effectively. Where the specific dimensional and spatial relationships of restraint rails and the pallets positioned therebetween do not characterize the cargo transport in use, the pallet restraint apparatus provided in the Deering et al. patent cannot be employed. Moreover, the pocket which is formed in the elastomeric slipper utilized in one form of the Deering pallet restraint apparatus also provides a receptacle within which debris can accumulate in the course of a relatively short period of usage of the apparatus.

A different type of anchoring device which provides a direct interlock between the bed of a freight transport vehicle and cargo containers carried therein is the twist lock structure illustrated and described in Baaso U.S. Pat. No. 4,125,077. The twist lock structure here contemplated requires modification of the existing bed of the transport vehicle for its installation.

Sterling U.S. Pat. No. 2,688,289 depicts and describes a cargo tie-down assembly which includes an undercut channel which functions as a keyway to receive a base structure affixed to a tie-down ring. The base structure is rotated in the channel to bring a flange carried on the base structure into locking engagement with the undercuts of the channel, and prevent the ring structure from being pulled out of the channel. The undercut channel provides lateral pockets which are largely enclosed and can become packed with dirt and grime, and then afford a favorable breeding environment for deleterious organisms. Moreover, the Sterling cargo tie-down assembly does not afford good anchoring capability against longitudinal movement along the length of the channel in which the tie-down ring is located, and it is therefore necessary to depend upon elongated straps or flexible elements extended around the cargo and attached to the tie-down ring in order to prevent shifting of the ring and base structure in a direction away from the cargo.

A system which is generally similar to that disclosed in the Sterling patent is described in Bass et al U.S. Pat. No. 3,344,749. The type of interlock provided in the Bass et al structure between the undercut channel and the ring carrying structure can, however, be manipulated to prevent longitudinal sliding movement of the ring structure relative to the channel.

Other patents disclosing devices which employ, in one form or another, undercut channels which are used in conjunction with tie-down devices for preventing the shifting of cargo, are those which are shown in Lautzenhiser et al. U.S. Pat. No. 3,478,995 and Elsner U.S. Pat. No. 2,735,377. In both of these patents, a ring-type structure is anchored in undercut rails or channels, and flexible straps are then used to extend from the rings around the cargo and retain it in position. Yet another patent of the strap ring, undercut channel type is that which is shown in Williams U.S. Pat. No. 2,052,914.

The described previously patented systems are exemplary of various prior art devices which have been utilized for the stabilization of cargo during transport. Some of the structures are quite useful for some forms of containers or pallets employed, and are suitable in certain types of trucks having floors which lend themselves to the required modification entailed in using the structure. Each of the devices, however, either presents structural installation problems, or poses undesirable sanitary conditions in use due to the inclusion of cavities or pockets, which make them less than optimum for use on reefers or refrigerator vehicles. Moreover, where belting or a flexible tie-down element is required as a part of the system in use, securement of the cargo is time-consuming and, in addition, the compressive or squeezing force exerted upon the containers by the straps or other flexible members used sometimes distorts or crushes the cargo containers and may "bruise" or damage the cargo.

BRIEF DESCRIPTION OF THE PRESENT INVENTION

The present invention provides a cargo stabilization system particularly adapted for use in refrigerated transport vehicles employed for carrying perishable goods. The stabilization system preserves the desideratum of assuring adequate circulation of air beneath the cargo, and concurrently firmly anchors the cargo, or pallets upon which the cargo is supported, against lateral or longitudinal shifting movement within the vehicle.

Broadly described, the cargo stabilization system of the invention includes a channeled cargo-supporting floor, and a manually actuated snubbing device which can be selectively positioned on the channeled floor and locked at the selected location to block movement of the cargo either longitudinally or laterally in the vehicle. The snubbing device forming a part of the system includes a snubbing block and a manually actuatable latching subassembly connected to the snubbing block and by which the snubbing block is selectively locked to, or released from, one or more of the floor channels. In a preferred form, the snubbing device includes cooperating wedge elements adapted for placement in one of the channels of the floor, a handle and an actuator bolt which is connected between one of the wedge elements and the handle to move the wedge elements relative to each other in a channel locking and releasing movement when the handle is manually manipulated.

Another object of the invention is to provide a relatively simple, mechanically strong cargo stabilizing system which can be quickly and easily installed in, or removed from, a reefer or refrigerator transport vehicle to function, when installed, to immobilize and prevent shifting of cargo carried in the vehicle.

Another object of the invention is to provide a cargo stabilization system which can be positioned and actuated quite easily by manual means in a selected location within a refrigeration transport vehicle of the type having a channelized floor so as to prevent either lateral or longitudinal shifting of cargo within the vehicle.

Another object of the invention is to provide a cargo stabilizing system which does not require, for its effectiveness, any alteration of existing refrigeration carrier structures in which it is used, and which does not define pockets or wells in which grease or dirt can become impacted to provide a breeding situs for deleterious organisms.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 3 is a sectional view taken along line 3—3 of FIG. 2.

FIG. 4 is a sectional view taken along line 4—4 of FIG. 3.

FIG. 5 is a plan view of the snubbing device utilized in the invention.

DETAILED DESCRIPTION OF A PREFERRED EMBODIMENT OF THE INVENTION

Figure 1:
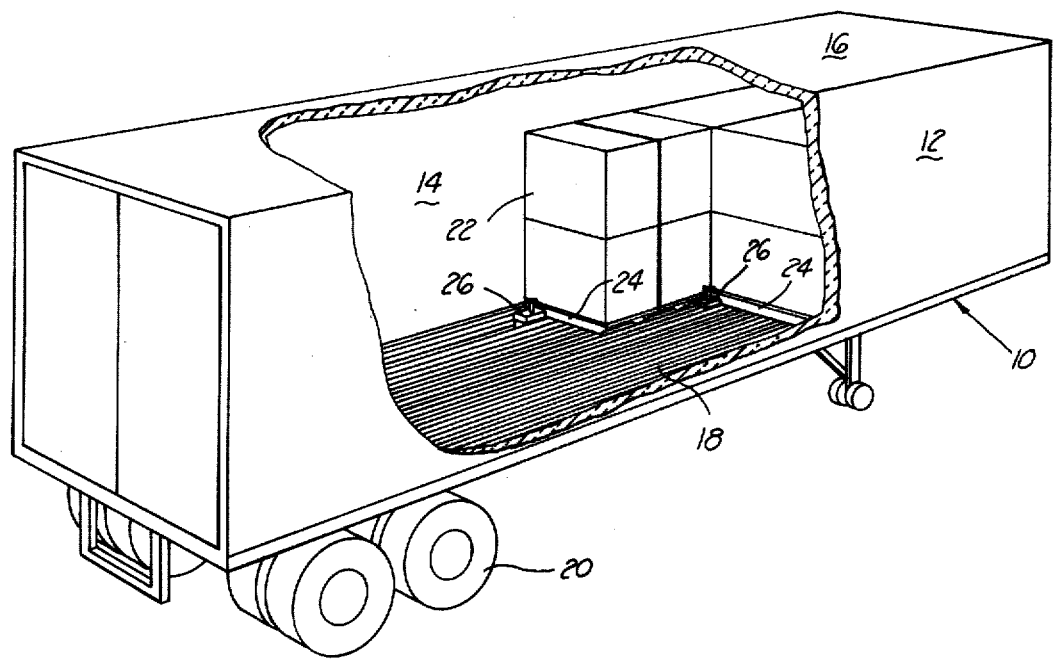
FIG. 1 is a perspective view of the trailer portion of a tractor-trailer rig adapted for refrigerated transport, and showing a portion of the trailer broken away to reveal the placement of cargo inside the trailer.

FIG. 1 of the drawings depicts a refrigerated transport trailer 12 of a type conventionally employed in combination with a tractor for over-the-road transport of perishable comestibles. The trailer includes side walls 12 and 14, a ceiling or roof 16 and a floor 18 which together form an elongated body closed at the front and rear, and supported upon grounded engaging wheels 20. Large cartons or containers 22 in which the perishable cargo is packaged are shown loaded in the front portion of the trailer 10, with the cartons supported upon pallets 24. The pallets 24 and cargo cartons 22 supported thereon are prevented from shifting within the trailer by the cargo stabilization system of the present invention, which system includes one or more snubbing devices 26 which are hereinafter described in detail.

Figure 2:
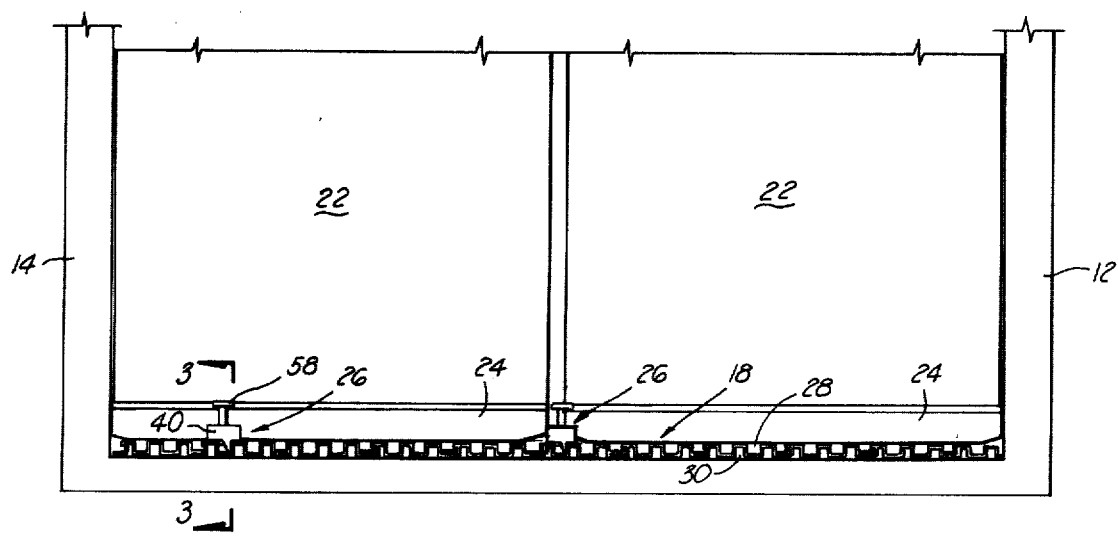
FIG. 2 is a transverse sectional view taken in a vertical plane transversely through the trailer body along the lower half thereof to reveal the sectional construction of the floor of the trailer, cargo carried within the trailer and certain snubbing devices forming a portion of the present invention.

The type of floor 18 which is illustrated as utilized in the depicted trailer 12 is referred to as a standard reefer floor, and is conventionally constructed of a plurality of interlocking, elongated extruded aluminum sections. The floor sections, when interlocked in position to form the floor as shown in FIGS. 1 and 2, define a plurality of alternating upwardly and downwardly facing corrugated channels, designated by reference numerals 28 and 30, respectively.

The alternating corrugated channels 28 and 30 are illustrated in enlarged detail in FIG. 4. Each upwardly opening channel 28 is defined by a pair of opposed, substantially parallel side walls 32 and 34, and these side walls also form the opposed side walls of downwardly opening channels 30. The upwardly opening channels 28 are each closed by a web portion 36 which extends across the bottom of each of these channels, and in similar fashion, the downwardly opening channels 30 are closed by an upper web portion 38 which extends across the top of each such channel. It will be noted in referring to FIGS. 2 and 3 that the pellet 24 rests upon the web portions 38 at the upper sides of the downwardly opening channels 30 so that air can freely circulate under the pallet via the upwardly opening channels 28, and thus provide adequate ventilation beneath the packaged cargo. The pallets 24 are, of course, of conventional slatted construction enabling the circulated air to contact the bottom of the cartons 22.

Other types of channelled floor structures are in use in reefers and refrigerated transports. Such types include the I-beam floor system, the weldable reefer floor system and the dry freight floor system. In general, however, each of these systems provides channelization extending longitudinally of the floor to enable adequate ventilation of the cargo by air flow therebeneath. The principles of the present invention are applicable to these various systems with minimal modification to the here described and illustrated preferred embodiment of the invention.

Referring to FIG. 3 of the drawings, the cargo stabilization system includes, as there illustrated, a manually actuatable snubbing device 26 in combination with the channeled cargo supporting floor 18. The snubbing device 26 includes a snubbing block 40 configured, in the illustrated embodiment, as a right parallelepiped. The width of the snubbing block 40 is such that it bridges across at least one of the upwardly opening channels 28 and rests at its opposite lower side portions upon the web portions 38 extending across and closing the tops of the downwardly opening channels 30. The height of the snubbing block 40 is variable, but is in any case sufficient to provide a substantial abutment against which a pallet 24 will bear when the snubbing device 26 is positioned adjacent the pallet.

In the illustrated embodiment of the invention, each of the snubbing devices 26 further comprises a manually actuatable subassembly which includes a pair of cooperating wedge elements. In the form of snubbing device shown in the drawings, one of the wedge elements is an elongated wedge block 42 corresponding in length to that of the snubbing block 40, and having a trapezoidal cross-sectional configuration as illustrated in FIG. 4. The other wedge element is a wedge-shaped projection or protuberance 44 which is formed integrally with the snubbing block 40, and projects from the lower side of the snubbing block downwardly into the upwardly opening channel 28.

It will be perceived in referring to FIG. 4 that the wedge block 42 is characterized in having a planar first face 42a which extends parallel to and abuts the side 32 of the upwardly opening channel 28 of the floor 18. On the opposite side of the wedge block 42, a planar second face 42b is formed and is inclined at an acute angle with respect to the plane occupied by the face 42a. The face 42b will be hereinafter referred to as the tapered or beveled face of the wedge block 42.

The wedge-shaped protuberance 44 is defined in part by a beveled or tapered planar first face 44b which extends parallel to the beveled face 42b of the wedge block 42, and in part by a planar face 44a which extends parallel to the inner surface of the side 34 of the upwardly opening channel 28. In cross-section, the wedge block 42 and the protuberance 44 together form a generally rectangular figure when the beveled surfaces 42b and 44b are in registration as shown in FIG. 4.

The wedge block 42 is movably mounted on the snubbing block 40 by means of an elongated bolt 46 which includes external threads 48 extending over the end portion of the bolt shank. The head 50 of the bolt 46 and the shank portion thereof adjacent the head are secured within the wedge block 42 by any suitable means so that the wedge block follows the axial movement of the bolt.

A handle element designated generally by reference numeral 52 is mounted at the top of the snubbing block 40 and threadedly engages the threads 48 on the end portion of the bolt 46. The handle element 52 is of T-shaped configuration and includes a barrel 54 which is axially bored and provided with an internal thread 56. The handle element 52 further includes a cross bar 58 connected to the barrel 54 at its center and extending normal to the axis of the barrel. It will be noted that the lower end of the barrel 54 bears against the upper surface of the snubbing block 40, and that the central bore in the barrel 54 is aligned with a circular opening or passageway 60 which extends through the snubbing block and receives the shank of bolt 46. The passageway 60 is slightly larger in diameter than the outside diameter of the shank of the bolt 46.

It will further be noted in referring to FIG. 5 of the drawings that the passageway 60 and the bolt 46 which extends therethrough to engage the handle 52 are offset from the center of the snubbing block 40, both in a transverse sense and in a longitudinal sense as these dimensions are measured normal to each other across the snubbing block. The effect of this arrangement is to provide additional versatility in the use of the snubbing device 26 in conjunction with the channeled floor 18 as will be hereinafter explained in greater detail.

In the use of the cargo stabilization system of the invention, one or more of the snubbing devices 26 are initially selectively located on the floor 18, with the wedging elements thereof disposed in selected ones of the upwardly opening channels 28 to stabilize the pallets 24 supporting the cargo 22. The cargo and pallets may be variously situated within the trailer, but a typical arrangement might be that shown in FIG. 1 of the drawings. With this arrangement it will be perceived that some of the cargo and pallets may be able to shift laterally of the trailer bed, as well as longitudinally. Either type of shifting or sliding may occur as the trailer is towed by the tractor over hills and around sharply banked curves.

In selectively locating the snubbing devices 26, it will be desirable to place the snubbing devices at locations such that neither transverse nor longitudinal displacement of the cargo 22 and pallets 24 can occur. To this end, one of the snubbing devices 26 is disposed, as illustrated, rearwardly of the rearmost pallet 24, and another of the snubbing devices is shown located at the inner side of one of the pallets 24 for the purpose of preventing undesirable lateral shifting of this pallet and the cargo it supports.

In the securement of each snubbing device 26 in the selected location, the handle 52 is first rotated so as to back the bolt 46 downwardly in the snubbing block 40 and thus lower the wedge block 42 relative to the wedge-shaped protuberance 44. By lowering the wedge block 42 in this fashion, it may be displaced laterally in the direction of the protuberance 44 so that the total transverse dimension of these two wedge elements is reduced, and both may be inserted into one of the upwardly opening channels 28. The overall transverse dimension of the combined wedge elements constituted by the wedge block 42 and protuberance 44 is, at this time, sufficiently reduced that no problem exists in sliding the snubbing device 26 longitudinally within the upwardly opening channel 28 until it has been placed in a position immediately adjacent and abutting the pallet 24 as shown in FIG. 3.

With the snubbing device 26 thus located, the handle 52 is rotated by gripping and turning the cross bar 58 so as to draw the bolt 46 upwardly into the threaded bore 56 of the handle, and in doing so, to draw the wedge block 42 upwardly relative to the snubbing block 40 and along the wedge-shaped protuberance 44. As the beveled face 42b of the wedge block 42 slides against the beveled face 44b of the wedge-shaped protuberance 44, the overall transverse dimension of the two wedge elements is increased, and the wedge block 42 is concurrently biased toward the left or, stated differently, away from the protuberance 44. By this continued movement, planar outer faces 42a and 44a of the wedge block 42 and protuberance 44 are brought to bear against the inner surfaces of the sides 32 and 34 of the upwardly opening channel 28.

Continued rotation of the handle 52 will continue to force the wedge block 42 laterally, and this block and the protuberance 44 will ultimately bind firmly between the opposed confining sides 32 and 34 of the upwardly opening channel 28. The engagement of the snubbing device 26 with the channel 28 as thus effected is sufficiently strong and tenacious that no longitudinal movement of the snubbing device within its receiving channel can occur. When the snubbing device 26 has been thus locked in the upwardly opening channel 28, the pallet 24 is prevented from shifting longitudinally within the trailer, provided the snubbing device has been positioned to the immediate rear of the pallet as shown in FIG. 3.

A similar restriction on lateral movement of a pallet 24 is obtained by placement of one of the snubbing devices 26 in a blocking position on the inwardly facing side of the pallet. It is in this usage that the offset or asymmetric arrangement of the handle 52 and associated bolt 46 with respect to the snubbing block 40 afford advantage. It will be perceived by referring to FIGS. 2 and 4 that the location of the inner edge of the pallet 24 with respect to the channels 28 and 30 may vary, depending on how close the pallet is placed to the wall 14 of the trailer and the width of the pallet. The inner terminal edge of the pallet may, for example, be located immediately over the center of one of the web portions 38 closing the top of one of the downwardly opening channels 28, or it can be at any one of various locations, including a location in which it is aligned with the center of the opening into one of the upwardly opening channels 28. Stated differently, the longitudinal inner edge of a pallet can be located, under differing loading conditions, at differing distances from the longitudinal axis of the nearest upwardly opening channel 28.

To best cope with lateral pallet shifting, the orientation of the snubbing block 40 relative to the channel with which the snubbing device 26 is engaged can be varied. This is accomplished by turning the snubbing block 40 around so that the wider side of the block (as measured from the handle barrel to the side edges of the block) extends further toward the lateral and internal edge of the pallet than would the relatively shorter side of the block, or alternatively, so locating the narrower side of the block. Further, in an alternate embodiment of the invention, the wedge-shaped protuberance 44 may be made as a separate wedge element not connected to the block 40, and in this case, the block 40 can be turned at 90° from its position shown in FIG. 5 so that it bridges all the way across the two adjacent web portions 38 closing the tops of the two adjacent downwardly opening channels 30, and thus extends at yet a different distance toward the lateral inner edge of the adjacent pallet 14. In other words, in such other form of the invention, the snubbing block 40 can be rotated through a full 360° about an axis of rotation extended through the snubbing block and normal to the floor and thus any side of the block can be made that which is nearest the lateral edge of the pallet.

It will thus be seen that by offsetting the shank 55 and bolt 46 of the handle 52 from the center of the snubbing block 40 (and also from any vertical plane of bisection of the block), and by making the wedge element constituted by the protuberance 44 a separate element not formed integrally with the block 40, four different distances of projection of the block 40 from the axis of the bolt 46 and barrel 54 toward either wall 12 or 14 of the trailer may be obtained. The parallel extension of the channels 28 and 30 in relation to the lateral inner edge of a cargo pallet 24 will thus not result in an undesirable amount of free space existing between the blocking side of the snubbing block 40 which is nearest the pallet, and the lateral inner edge of the pallet.

The cargo stabilization system of the invention does not require any structural modification of existing channelized floors widely used in refrigeration vehicles. Further, the locking action obtained by the cooperating wedge elements has been found adequate to firmly anchor the snubbing block in position even in those instances, sometimes encountered, where the sides of the upwardly opening channels are divergent from each other in the direction of the opening at the upper side of the channel.

It will also be apparent that with slight modification to the preferred embodiment illustrated in the drawings by placement of a slot extending inwardly a small distance from the planar face 44a of the wedge-shaped protuberance 44 at the location where the protuberance joins the snubbing block 40, the snubbing devices can be used easily and efficiently with channelized floors which include a series of transversely spaced T-shaped elements. In such case, the flanges constituting the cross-bars of the T-shaped elements of such floors are allowed to extend into the slot formed between the snubbing block 40 and the web-shaped protuberance 44, and into the slot which exists between the top of the wedge block 42 and the snubbing block. The handle is then rotated to draw the wedge block 42 upwardly until engagement is effected either with the opposed sides of the existent channels formed by the T-shaped members, or until the snubbing block is itself clamped at its lower side against one of the cross-bars of a T-shaped element, or until both locking actions occur.

Manual setting of the snubbing devices 26 in their locked status is easily accomplished, as is the release of snubbing devices when the cargo is to be unloaded. Further, the snubbing devices are quite compact and can be easily stored on the carrying vehicle when they are not in use.

Although a preferred embodiment of the invention has been herein described in order to clearly illustrate the structural and operating principles which underlie the most basic form of the invention, it will be understood that various changes and modifications in structure and form can be effected without departing from these basic principles, and all such variations and modifications with respect to the illustrated and described preferred embodiment are deemed to be circumscribed by the scope of the invention.

What is claimed is:

1. A cargo stabilizing system for preventing shifting of cargo during transport comprising:
   a corrugated channeled cargo supporting floor defining a plurality of elongated, substantially parallel channels, each having a pair of opposed parallel side walls and each having a lower web portion extending between the lower edges of the side walls and forming a channel bottom, and said channels being interconnected by an upper web portion which extends between the upper edges of a side wall of two adjacent channels; and
   a snubbing device releasably engaging the floor channels and including:
      a snubbing block resting on top of the floor and projecting upwardly therefrom, said snubbing block extending across one of said channels and resting upon a pair of adjacent ones of said upper web portions;
      a first wedge element formed integrally with and projecting downwardly from said snubbing block into one said channel underlying said snubbing block, said first wedge element having a surface inclined with respect to the planes of said channel side walls;
      a second wedge element positioned movably in said one channel for vertical and horizontal movement therein and having a lower side extending substantially parallel to the lower web portion of said one channel and including an inclined side extending substantially parallel to the inclined surface of said first wedge element and positioned adjacent thereto whereby upward movement of said second wedge element in said one channel will bring said inclined side wall into contact with said inclined surface, and thereafter displace said second wedge element laterally into contact with a side wall of said one channel;
      an elongated bolt including:
         a head countersunk within the lower side of said second wedge element; and
         a bolt shank having a threaded end portion projecting upwardly from said head through said second wedge element and through said snubbing block so that said threaded end portion of the shank projects above the snubbing block; and
      a handle element over said snubbing block and including an elongated, axially bored barrel having a lower end engaging the upper side of said snubbing block, and having internal threads in said barrel engaging the threaded end portion of said bolt whereby turning said handle element to rotate said barrel enables said second wedge element to be drawn upwardly in said one channel toward said snubbing block and lowered to a location within said one channel where the lower side of said second wedge element is immediately adjacent the lower web portion of said one channel.

2. A cargo stabilizing system as defined in claim 1 wherein said snubbing block is a solid block of right parallelepiped configuration having a lower side resting upon said pair of adjacent ones of said upper web portions, an upper side on the opposite side of said block from said lower side and four side surfaces extending between said upper surface and said lower surface, two of said side surfaces on opposite sides of said snubbing block being disposed at different distances from the location of said bolt shank where said bolt shank extends through said snubbing block whereby said snubbing block, by rotation around said bolt shank, can be positioned with a side face selectively positioned at one of two selectable distances from said palletized cargo.

3. A snubbing device for stabilizing cargo carried upon a corrugated channeled cargo-supporting floor to thereby prevent shifting of the cargo during transport in a truck having said channeled cargo-supporting floor therein comprising:
   a snubbing block adapted to rest on top of the channelized floor and to bridge across one of the floor channels;
   a first wedge element positioned beneath said snubbing block and dimensioned and adapted for extension into the floor channel bridged across by said snubbing block, said first wedge element having a surface inclined with respect to a vertical plane and having a side wall spaced from said inclined surface and adapted to contact a side of a floor channel on top of which said snubbing block is rested;
   a second wedge element positioned beneath said snubbing block and adapted for vertical and lateral movement in a channel bridged across by said snubbing block and relative to said first wedge element, said second wedge element having a lower side adapted by its position to face the bottom of said bridged channel, and further including a surface extending genrally parallel to the inclined surface of said first wedge element and positioned adjacent thereto, said second wedge element further including a wall adapted to contact a side of said bridged channel as said second wedge element is moved laterally in said one floor channel whereby upward movement of said second wedge element in said bridged channel will bring said surface of said second wedge element into contact with the inclined surface of said first wedge element, and thereafter displace said second wedge element, laterally;
   an elongated bolt including:
      a head adjacent the lower side of said second wedge element; and
      a bolt shank having a threaded end portion and projecting upwardly from the head through the second wedge element and through the snubbing block so that at least a part of the threaded end portion of the shank projects above the snubbing block; and
   a handle element over said snubbing block and operatively engaging said threaded portion of said bolt shank whereby rotative movement of said handle causes relative movement between said handle and said bolt shank along a line coincident with the axis of the bolt shank whereby turning said handle enables said second wedge element to be moved upwardly and laterally in said bridged channel toward said snubbing block, and lowered within said one channel to disengage said second wedge element from said first wedge element.

4. A snubbing device for stabilizing cargo as defined in claim 3 wherein said first wedge element is formed integrally with said snubbing block.

5. A snubbing device for stabilizing cargo as defined in claim 3 wherein said snubbing block is of right parallelepiped configuration, and said bolt shank axis extends through said snubbing block at a location offset from the vertical axis of symmetry of said snubbing block.

6. A snubbing device for stabilizing cargo as defined in claim 5 wherein said first wedge element is formed integrally with said snubbing block.

* * * * *